United States Patent
Wilson et al.

(10) Patent No.: US 11,829,740 B2
(45) Date of Patent: Nov. 28, 2023

(54) SYSTEM AND METHOD FOR DEPLOYMENT LEVEL MANAGEMENT OF SUBSCRIPTION BASED SOLUTIONS

(71) Applicant: Dell Products L.P., Round Rock, TX (US)

(72) Inventors: Lucas A. Wilson, Cedar Park, TX (US); Dharmesh M. Patel, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 225 days.

(21) Appl. No.: 17/570,565

(22) Filed: Jan. 7, 2022

(65) Prior Publication Data

US 2023/0222468 A1 Jul. 13, 2023

(51) Int. Cl.
*G06F 8/60* (2018.01)

(52) U.S. Cl.
CPC ...................................... *G06F 8/60* (2013.01)

(58) Field of Classification Search
None
See application file for complete search history.

(56) References Cited

U.S. PATENT DOCUMENTS

| | | | |
|---|---|---|---|
| 6,317,815 B1 | 11/2001 | Mayer et al. | |
| 9,178,948 B2 | 11/2015 | Chen et al. | |
| 9,705,995 B2 | 7/2017 | Edlund et al. | |
| 10,044,522 B1 | 8/2018 | Shamis et al. | |
| 2003/0131028 A1 | 7/2003 | Radi et al. | |
| 2008/0235784 A1 | 9/2008 | Basner et al. | |
| 2008/0256641 A1 | 10/2008 | Lo | |
| 2012/0005649 A1* | 1/2012 | Lavin | G06F 9/44578 717/110 |
| 2012/0311673 A1 | 12/2012 | Sodah | |
| 2013/0339306 A1 | 12/2013 | Kim et al. | |
| 2015/0005033 A1 | 1/2015 | Petersson et al. | |

(Continued)

OTHER PUBLICATIONS

Souvik Chakravarty (2019). Arm System Control Processor (SCP) Firmware-101. Linaro. https://static.linaro.org/connect/san19/presentations/san19-117.pdf.

(Continued)

*Primary Examiner* — Qing Chen
(74) *Attorney, Agent, or Firm* — Womble Bond Dickinson (US) LLP

(57) ABSTRACT

Methods, systems, and devices for providing for providing computer implemented services using managed systems are disclosed. To improve the likelihood of the computer implemented services being provided, a subscription based model may be used to manage the managed systems. The subscription model may utilize a highly accessible service to obtain information regarding capabilities of managed systems to present information regarding all potential solutions that the managed systems may provide. In some cases, subscription decisions may be based on inaccurate information. To limit the potential impact of subscription decisions made based on inaccurate information, the system may operate using a distributed control plane and management model where the entities most closely related to or likely to have accurate information is empowered to honor, reject, and/or remediate subscription decisions made by other entities.

20 Claims, 12 Drawing Sheets

(56) References Cited

U.S. PATENT DOCUMENTS

| | | | |
|---|---|---|---|
| 2015/0271276 A1* | 9/2015 | Edlund | H04L 41/5012 |
| | | | 709/224 |
| 2015/0373012 A1 | 12/2015 | Bartz et al. | |
| 2016/0150396 A1 | 5/2016 | Milhizer | |
| 2017/0006119 A1 | 1/2017 | Pogrebinsky et al. | |
| 2017/0048713 A1 | 2/2017 | Guday et al. | |
| 2017/0090912 A1* | 3/2017 | Fuglsang | G06F 8/30 |
| 2017/0244783 A1 | 8/2017 | Maresca | |
| 2017/0359356 A1 | 12/2017 | Brandwine | |
| 2021/0067406 A1 | 3/2021 | Myers et al. | |
| 2021/0160255 A1 | 5/2021 | Cherkas et al. | |
| 2021/0360074 A1* | 11/2021 | Long | H04L 67/51 |
| 2023/0171586 A1 | 6/2023 | Holmes | |

OTHER PUBLICATIONS

"What Is a SmartNIC?," Web page <hhttps://blogs.nvidia.com/blog/2021/10/29/what-is-a-smartnic/https://blogs.nvidia.com/blog/2021/10/29/what-is-a-smartnic/>, 1 page, Oct. 29, 2021, retrieved from Internet Archive Wayback Machine <http://web.archive.org/web/20211209195130/https://blogs.nvidia.com/blog/2021/10/29/what-is-a-smartnic/> on Jan. 20, 2022.

* cited by examiner

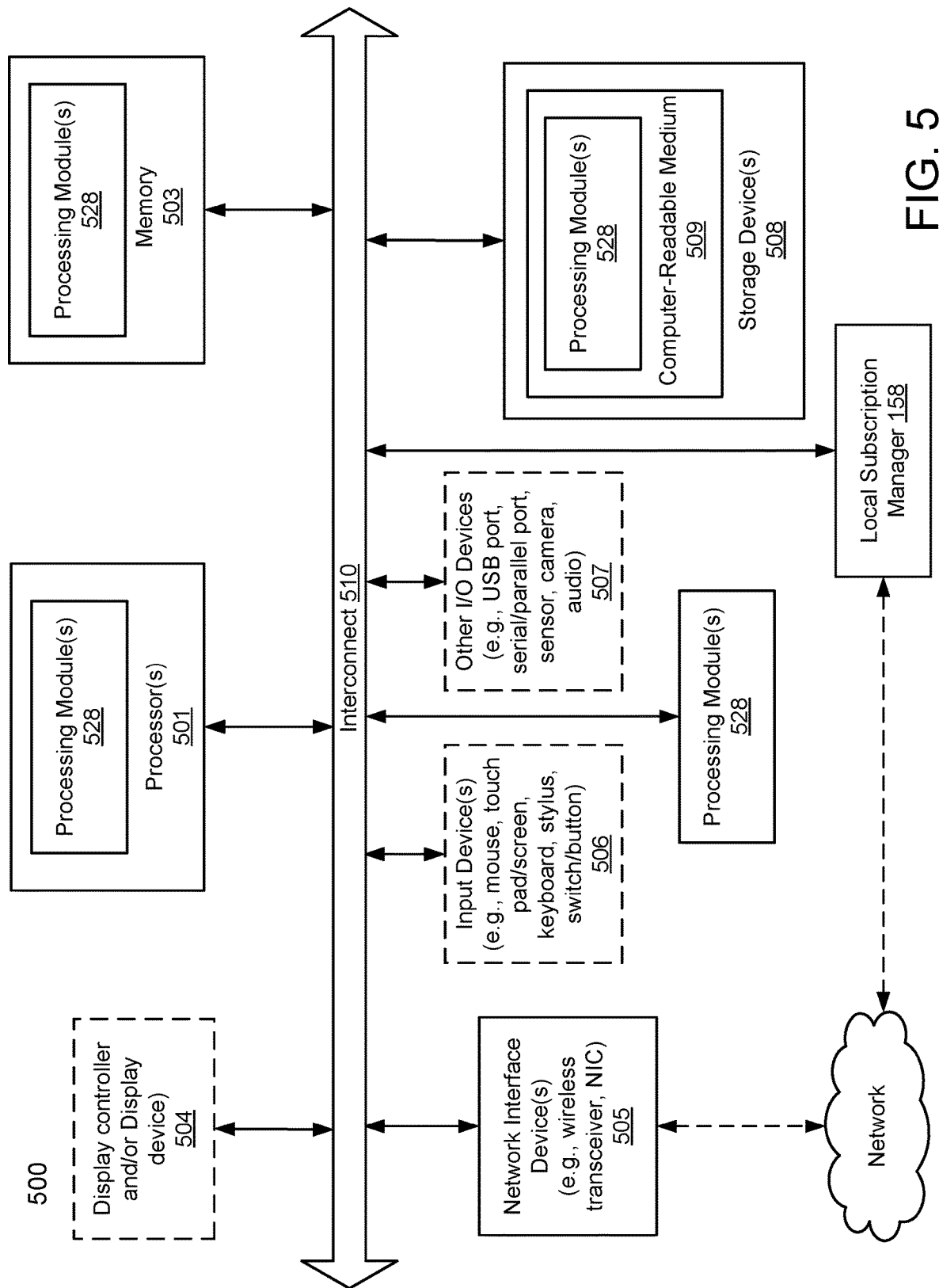

SYSTEM AND METHOD FOR DEPLOYMENT LEVEL MANAGEMENT OF SUBSCRIPTION BASED SOLUTIONS

FIELD DISCLOSED HEREIN

Embodiments disclosed herein relate generally to system management. More particularly, embodiments disclosed herein relate to systems and methods to manage deployment level configuration of components of a distributed system.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 5 shows a block diagram illustrating a computing device in accordance with an embodiment.

DETAILED DESCRIPTION

Figure 1A:
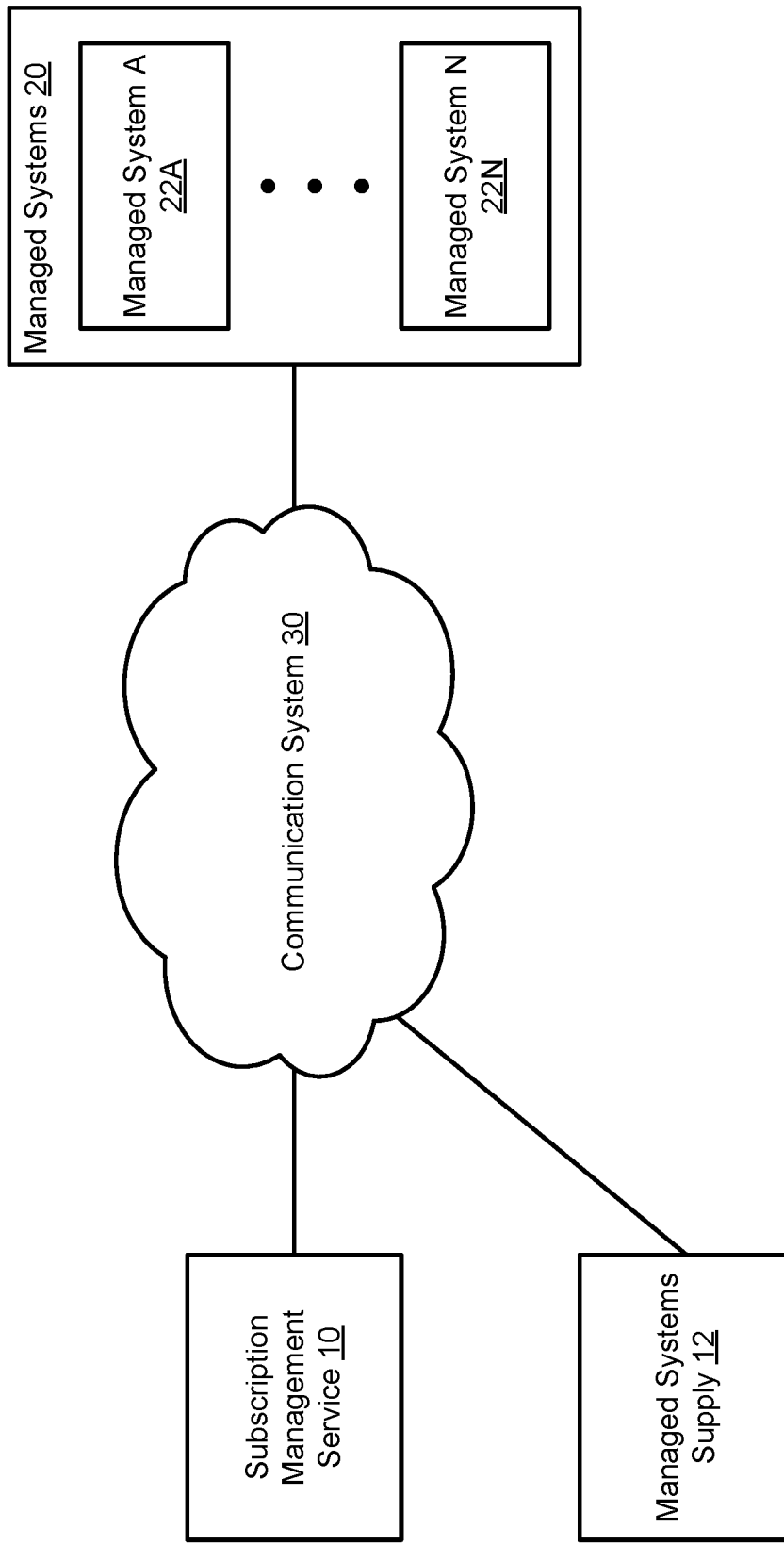
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems may need to operate in a predetermined manner conducive to, for example, execution of applications that provide the computer implemented services. Similarly, the managed system may need access to certain hardware resources and also software resources such as drivers, firmware, etc. to provide the desired computer implemented services. Different computer implemented services may have different hardware and/or software resources needs. An aggregation of different types of computer implemented services may need to be provided so that corresponding solutions may be provided.

To improve the likelihood of the computer implemented services being provided, embodiments disclosed here relate to methods and systems for managing managed systems using a subscription based model. The subscription model may utilize a highly accessible service to obtain information regarding capabilities (e.g., hardware resources) of managed systems to present information regarding all potential solutions that the managed systems may provide.

By presenting users with such information, the users may not need to be well versed in the underlying hardware and software components necessary for the solutions to be provided. Further, as the hardware components of a managed system are changed over time, the compatible solutions may be continuously updated so that users may be continuously appraised of all possible solutions that may be provided using the managed systems.

By having access to this information, users may make better informed decisions regarding which solutions should be implemented by managed systems. Further, by continuously updating the compatible solutions presented to users, the cognitive burden on the users may be greatly reduced as the hardware components of the managed systems change over time. Additionally, by virtue of this selection approach, deployment of various components for incompatible solutions may be avoided thereby preventing impairments of the managed systems.

However, by virtue of its distributed nature, not all components of the distributed system may have access to accurate information. Consequently, some subscription decisions made for various managed systems may not actually be compatible with the managed systems. If implemented, such changes in subscriptions may negatively impact the computer implemented services provided by the distributed system.

To limit the potential impact of subscription decisions made based on inaccurate information, a system in accordance with embodiments disclosed herein may operate using a distributed control plane and management model where the entities most closely related to or likely to have accurate information is empowered to honor, reject, and/or remediate subscription decisions made by other entities. By distributing command and control across the distributed system, the impacts of inaccurate information may be reduced by providing the entity that is most likely to have accurate information the ability to modify previously made decisions (e.g., through rejection or adoption).

For example, while solution level decisions may be made by a subscription management service, local deployment managers tasked with managing any number of managed systems may review the solution deployment decisions for various subscription dependencies, check the dependencies against the managed systems, and automatically take action of the managed systems are not able to meet all of the subscription dependencies. To do so, the deployment managers may, for example, request authorization for additional subscriptions to place the managed systems into compatibility with the dependencies for the solution deployment decisions.

Thus, embodiments disclosed herein may address the challenge of information distribution in a distributed system. For example, rather than attempting to ensure that all information on which decisions is based is accurate (which may incur an unreasonable amount of computational overhead), the disclosed system may allow for undesirable decisions to be made but subsequently corrected when contradictory, but likely more accurate, data is used to further evaluate the previously made decisions. Consequently, the overhead for data distribution and consistency may be reduced while still ensuring that decisions consistent with the most accurate data in the distributed system are honored and enforced.

In an embodiment, a computer-implemented method for managing computer implemented services provided by managed systems is provided. The method may include obtaining, by a deployment manager that manages the managed systems, a solution request for the managed systems, the solution request indicating a solution to be provided using at least one subscription; making, by the deployment manager, a determination that the solution is incompatible with the managed systems; in response to the determination: making, by the deployment manager, a second determination that the managed systems may be made compatible with the solution using at least one additional subscription; in response to the second determination and by the deployment manager: obtaining authorization for the at least one additional subscription; deploying the at least one additional subscription to the managed systems based on the obtained authorization to enhance the managed systems with at least one new functionality; and deploying the at least one subscription to the enhanced managed systems, the at least one subscription being dependent on the at least one new functionality.

The computer-implemented method may also include obtaining, by the deployment manager, a second solution request for the managed systems, the second solution request indicating a second solution to be provided using at least one other subscriptions; making a third determination, by the deployment manager, that the second solution is incompatible with the managed systems; in response to the third determination: making a fourth determination that the managed systems may not be made compatible with the solution using any other subscriptions; in response to the fourth determination: performing an action set to remediate a solution deployment failure of the second solution.

The action set may include notifying a subscription manager of the solution deployment failure, the notification indicating a missing functionality of the managed systems that may not be remediated through subscription modifications.

The action set may further include deploying an additional managed system to the managed systems, the additional managed system being capable of providing the missing functionality of the managed systems.

The action set may also include deploying an impaired solution in place of the second solution in response to receiving an authorization to deploy the impaired solution in place of the second solution, the impaired solution providing a subset of functionality of the second solution due to the missing functionality of the managed systems; and registering the deployed impaired solution with a subscription management system and the managed systems.

The computer-implemented method discussed above may further include obtaining, by the deployment manager, a second solution request for the managed systems, the second solution request indicating a second solution to be provided using at least one other subscriptions; making a third determination, by the deployment manager, that the second solution is compatible with the managed systems; in response to the third determination: deploying the at least one other subscriptions to the managed system.

Deploying the at least one additional subscription to the managed systems may include enforcing, by the deployment manager using a first local subscription manager hosted by a first managed system of the managed systems, the at least one additional subscription on the first managed system.

Enforcing the at least one addition subscription may also include modifying enablement of at least one hardware component of the first managed system; modifying operation of a startup manager of the first managed system; modifying operation of an operation manager of the first managed system; and modifying operation of a software stack of the first managed system.

Modifying the enablement of the at least one hardware component may include during a startup orchestrated by the startup manager: depowering a first hardware component of the hardware components, the first hardware component being otherwise powered; powering a second hardware component of the hardware components, the second hardware component otherwise being depowered; and completing the startup to prevent the operation manager from utilizing the first hardware component and allow the operation manager to utilize the second hardware component, the operation manager mediating access of the first hardware component and the second hardware component by the software stack.

Deploying the at least one subscription to the enhanced managed systems may include enforcing, by the deployment manager using the first local subscription manager, the at least one subscription on the first managed system.

Deploying the at least one subscription to the enhanced managed systems may also include enforcing, by the deployment manager using a second local subscription manager hosted by a second managed system of the managed systems, the at least one subscription on the second managed system.

The first local subscription manager comprises an out of band manager hosted by the first managed system and that operates independently from the first managed system.

A non-transitory media may include instructions that when executed by a processor cause the computer-implemented method to be performed.

A managed system may host a local subscription manager that may include the non-transitory media and a processor, and may perform the computer-implemented method when the computer instructions are executed by the process.

Turning to FIG. 1A, a block diagram illustrating a system in accordance with an embodiment is shown. The system may provide for automated management of one or more managed systems 20. A managed system may include any number of computing devices (e.g., data processing systems) that may each include any number of hardware components (e.g., processors, memory modules, storage devices, communications devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services. Changes in the hardware and/or software components may provide for various types of different computer implemented services to be provided over time.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
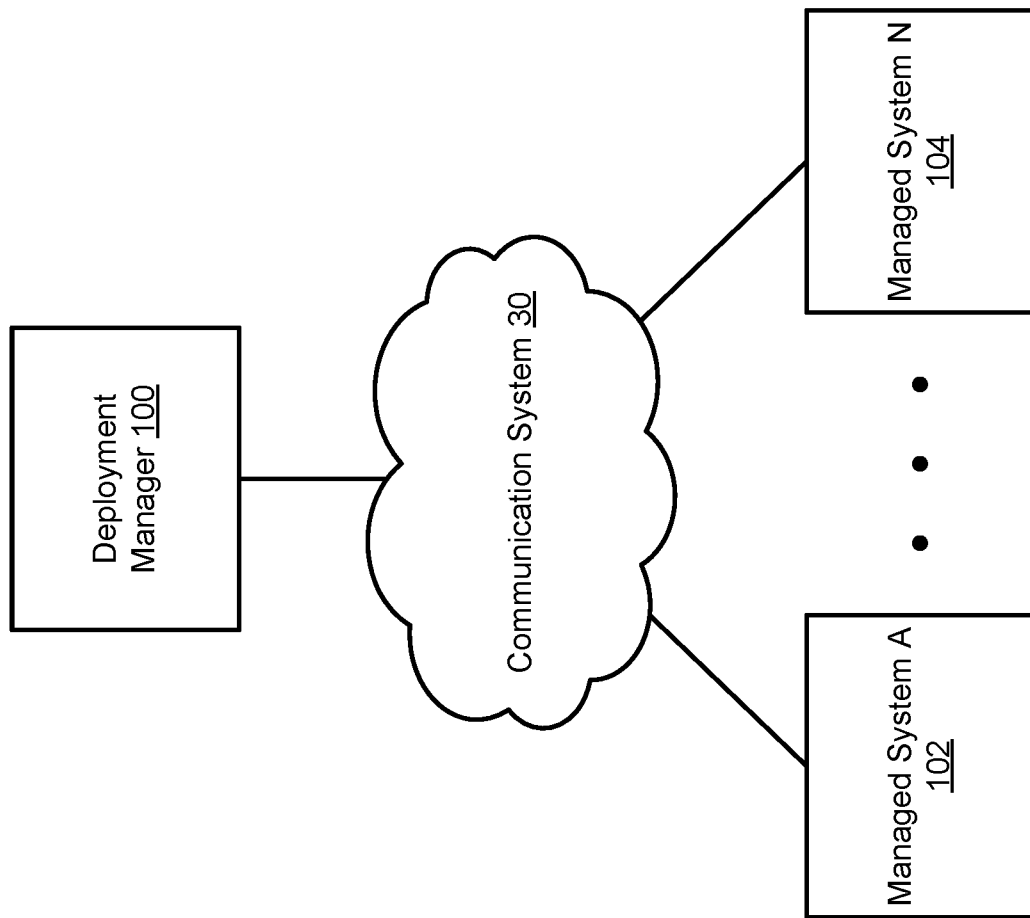
FIG. 1B shows a block diagram illustrating a deployment in accordance with an embodiment.
Figure 1C:
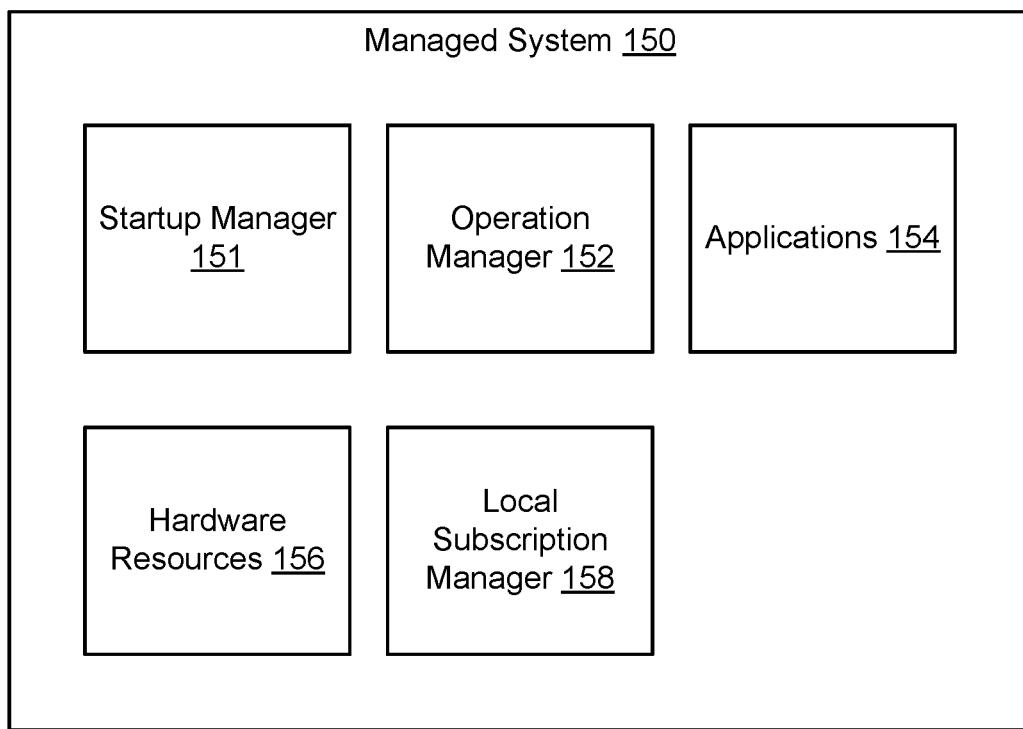
FIG. 1C shows a block diagram illustrating a managed system in accordance with an embodiment.

To provide the aforementioned computer implemented services, any of the managed systems 22A, 22N may need to operate in a predetermined manner. For example, certain hardware components may need to be operational and/or certain software components may need to be operating for the managed systems to provide computer implemented services (e.g., to operate as a solution). Different configurations of the hardware components, software components, and/or applications may need to be implemented by managed systems 20 depending on the computer implemented services desired to be provided by the respective managed systems. Refer to FIG. 1C for additional details regarding managed systems 20.

Additionally, any number of the managed system may operate (e.g., as part of a deployment) to provide various computer implemented services independently or cooperatively with other such managed systems. In such scenarios, the operation of a group of managed system may be managed by a local control plane for those managed systems. Further, the operation of some managed systems may be dependent on the operation of other managed systems (e.g., which may provide services utilized by other managed systems). Refer to FIG. 1B for additional details regarding groups of managed systems.

However, to provide desired computer implemented services, as noted above, a managed system may need to have certain capabilities. For some capabilities, such as those that are provided by software components, a lack of the capability may be remediated by deploying appropriate software components (which may assume that certain hardware components necessary for operation of the software components are available). However, some capabilities may require certain hardware components to be present in a managed system.

For example, in a data storage scenario, a managed system may need to include a hardware storage controller for certain storage functionalities to be provided. In another example, a managed system may need to include a graphics processing unit, application specific integrated circuit, or other type of special purpose hardware device to provide other types of functionalities. In a further example, a managed system may need to include minimum quantities and/or types of general computing components such as processors, memory modules, storage devices, etc. for other types of functionalities to be provided.

If a managed system is instructed to perform various functionalities which it is unable to provide or unable to receive from other managed systems, then the managed system may not provide the functionalities which it has been instructed to provide. Thus, if capabilities of managed systems are not taken into account when making configuration decision, the resulting configured managed systems may be unable to provide or may only provide impaired (to some extent) desired computer implemented services.

In general, embodiments disclosed herein relate to system, devices and methods for managing one or more managed systems in a manner that may improve the likelihood of the managed system being able to provide desired computer implemented services over time. To do so, a system in accordance with embodiments disclosed herein may provide a distributed system for automatically identifying and implementing hardware and/or software configurations of managed systems (e.g., to provide an integrated solution). The distributed system may automatically perform processes for discovering capabilities of managed systems and ensure that only configurations compatible with the capabilities of the managed systems are enforced on the managed systems.

For example, if it is determined that a managed system lacks the ability to provide certain functions necessary for other functions to be provided, then the system may automatically (i) attempt to modify the operation of the managed system so that it is able to provide the necessary function, (ii) implement the desired function in manner that may be impaired by the lock of the necessary function, and/or (iii) reject modifications of the functionality of the managed system that cannot be provided without the necessary function.

Ascertain whether certain functions may be performed by managed systems, a subscription management service may update itself regarding the capabilities of the managed systems, and take into account the capabilities and limitations thereof. However, by virtue of the distributed nature of such systems, in some scenarios, the subscription management service may make configuration decisions for the managed systems using outdated or incorrect information. Consequently, the managed systems may be subject to attempts to reconfigure them in a manner that is inconsistent with their actual capabilities.

To further limit the possibility for incompatible configurations being employed by managed systems, deployment managers for the managed systems my independently decide whether and/or to what extent requests for changes in configuration of the managed systems should be honored, modified, and/or rejected. The deployment managers may make such decisions at a deployment level so that the functionalities of multiple managed systems may be taken into account when ascertaining whether a request for a change in a managed system may be incompatible with it and/or other a group of managed systems.

To manage configurations of the managed systems, a subscription based model may be utilized. The subscription based model may allow a person to select a desired functionality for one or more managed systems. Based on the selection, configurations (e.g., functionality subscription)

for various managed systems may be selected and distributed for enforcement. The configurations may specify any number of enablement/disablements for hardware and software components, as well as any number of configurations for the hardware and/or software components. These subscriptions may be distributed to deployment managers that operate as part of a local control plane for each deployment of any number of managed systems. The deployment manager may ascertain whether to distribute and enforce the subscriptions, whether to request that other subscriptions be distributed and enforced prior to enforcement of other subscriptions (e.g., to ensure that managed systems include necessary functions for the other subscriptions), and/or whether to reject certain subscriptions (e.g., those that implicate functions that cannot or will not be provided by the managed systems and are prerequisites to the subscriptions).

By doing so, embodiments disclosed herein may (i) reduce the cognitive burden for selecting and managing systems to provide desired computer implemented services, (ii) may improve the quality of computer implemented services by ensuring that that capabilities of the managed systems are known, and/or (iii) facilitate subscription management the distributed systems to remediate the potential for inaccurate information being used as a basis for configuration decisions.

To provide the above noted functionality, a system in accordance with an embodiment may include subscription management service 10. Subscription management service 10 may facilitate (i) selection and procurement of managed system to a client site (e.g., a deployment location), and (ii) automatic configuration of managed systems 20 to provide an integrated solution and/or different solutions over time. To do so, subscription management service 10 may (i) obtain information indicating desired functions of one or more of managed systems 20, (ii) select and deploy one or more managed systems 20 to a client site (e.g., which may be stored in managed systems supply 12 prior to deployment), (iii) track changes in the capabilities of managed systems 20 over time, and (iv) use the tracked changes in capabilities to select and deploy changes in solutions provided by managed systems 20.

To deploy a new solution, a software stack (e.g., operating system, applications, drivers, etc.) may be instantiated on the managed system. However, various software stacks may have requirements regarding hardware components and/or software components necessary for operation of the software stacks. The tracked capabilities may be used to restrict (e.g., from deployment) software stacks that may be impaired (e.g., entirely or partially) when deployed to a managed system and allow other software stacks that may be unlikely to be impaired when deployed to the managed systems.

As part of the process for selecting and deploying one or more managed systems 20, subscription management service 10 may take into account a range of factors to identify which capabilities may be desired for use by a requesting entity over time. Based on these factors, subscription management service 10 may select one or more managed systems from managed systems supply 12 that include more features and/or capabilities than those required to immediately address a request from the requesting entity. The selection may be made on the basis that the requesting entity may be likely to request additional features and/or capabilities in the future. Consequently, managed systems 20, when deployed to a client site (e.g., private or shared datacenter), may include sufficient hardware components to address a range of different use cases and solution, beyond those that may be immediately apparent to a requesting entity. The additional capabilities (e.g., various hardware resources) may take the form of, for example, additional processors, memory modules, storage devices, graphical processing units, network interface devices, and/or other types of hardware components. Likewise, compatibility with various types of software components may be taken into account such that a range of different software components may be dynamically deployed to managed systems 20 over time (e.g., based on changing uses of managed systems 20). However, over time the hardware resources of the managed systems may change thereby changing the compatibility of managed systems with various solutions over time.

The distributed system may allow a provider of managed systems 20 to selectively manage various functionalities provided by managed systems 20. For example, the distributed system may allow for different solutions to be provided by managed systems 20 over time. By doing so, a provider of managed systems 20 may tailor the functions provided by managed systems 20 (e.g., from all possible functions) to only those requested, desired, and/or procured by an operator, manager, and/or user of managed systems 20. Doing so may allow for cost controls for various solutions to be put in place by a user of a managed system.

For example, consider a scenario where a provider of a managed system does so on a contractual basis where a user of the managed system agrees to purchase subscriptions for various functionalities, hardware components, and/or software components (e.g., the aggregate being solutions). The user may use subscription management service 10 to select to which of the aforementioned solutions the user wishes to have enabled, to the extent of such enablement, durations of enablement, etc. After an initial selection leading to deployment of managed systems 20, the user may modify their subscription to allow for other solutions to be provided by managed systems 20. In response, subscription management service 10 may cooperate with local subscription managers hosted by managed systems 20 and deployment managers to reconfigure the operation of managed systems 20 to allow these additional features to be utilized by the users. However, by virtue of the nature of the distributed system, subscription management service 10 may not have access to accurate capability information for various managed systems. Consequently, subscription management service may make configuration decisions not based on accurate information. To address such configuration decisions, as discussed below, deployment managers may automatically take action to (i) modify the managed systems such that they do not lack necessary capabilities for the solutions, (ii) deploy solutions that may be impaired if authorized to do so, and/or (iii) rejection deployment of such solutions. By doing so, embodiments disclosed herein may automatically reduce the impact of inaccurate information on the operation of the distributed system.

To allow for users or other persons associated with managed systems to elect into such subscriptions, subscription management service 10 may provide graphical user interfaces that allow such selections to be made. The graphical user interfaces may be implemented, for example, as webpages (or other types of interfaces) accessible to the users or other persons via other devices (e.g., client/user devices not illustrated in FIG. 1A but may be operably connected to subscription management service 10 via communication system 30). When an election is made, subscription management service 10 may record the election and send information regarding the elected subscriptions to deployment managers and/or local subscription managers hosted by managed systems 20. Once sent, the deployment managers may modify the operation of managed systems 20 such that the operation of managed systems 20 matches the elections received and/or recorded by subscription management service. In some cases, the deployment managers may reject the modifications in operation of managed systems 20, which may prompt subscription management service 10 to reconsider its configuration decisions for managed systems 20.

To facilitate solution selection, the graphical user interfaces presented to the users may present solutions that are believed to be compatible with managed systems 20. The presented solutions may be based on a current configuration and/or capabilities of managed systems 20. Accordingly, the persons tasked with managing managed systems 20 may not need to be aware of the current configuration of managed systems 20 to identify which solutions the managed systems may provide.

When providing the aforementioned information regarding subscription elections to deployment managers and/or local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the subscription management information, the deployment managers and/or local subscription managers may independently enforce the terms of elected subscriptions on managed systems even when, for example, one or more of the local subscription managers are unable to communicate with subscription management service 10 (e.g., after receiving the subscription management information). Consequently, user access to solutions provided by managed systems 20 may be automatically revoked by the managed systems thereby facilitating distributed management of the managed systems that does not rely on or require communication with other entities.

Any of subscription management service 10, managed systems supply 12, and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10, managed systems supply 12, and managed systems 20 are operably connected via communication system 30. Communication system 30 may allow any of subscription management service 10, managed systems supply 12, and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems supply 12, managed systems 20, and/or communication system 30 may be adapted to perform one or more protocols for communicating via communication system 30.

While illustrated in FIG. 1 with a limited number of specific components, a system may include additional, fewer, and/or different components without departing from embodiments disclosed herein.

Turning to FIG. 1B, a block diagram illustrating a deployment including managed systems 102, 104 in accordance with an embodiment is shown. Like named components in FIGS. 1A-1B may be similar.

The deployment may provide any number and type of computer implemented services. The deployment may be located, for example, at a user selected site, a data center, or another location. The deployment may provide various solutions to users of, for example, an organization on a contractual basis. For example, the organization may agree to pay fees for the solutions provided by the deployment. The solutions may include any number and type of computer implemented services provided by any number of managed systems 102, 104.

The deployment may include deployment manager 100. Deployment manager 100 may locally manage any number of managed systems. For example, the subscription management service may provide information to deployment manager 100 which may in turn manage managed systems 102, 104 based on the information.

To facilitate management, deployment manager 100 may (i) host various software images to facilitate deployment of software necessary for various solutions for managed systems 102, 104, (ii) facilitate identification of solutions compatible with managed systems 102, 104, (iii) provide information regarding the compatible solutions to other entities (e.g., such as the subscription management service), (iv) manage attempts to deploy solutions that are not compatible with managed systems 102, 104, and/or (v) provide other management functionalities.

Deployment manager 100 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

Turning to FIG. 1C, a block diagram illustrating managed system 150 in accordance with an embodiment is shown. Managed system 150 may be similar to any of managed systems 20 shown in FIGS. 1A-1B. Managed system 150 may provide desired computer implemented service by allowing for its automatic reconfiguration over time based on subscriptions maintained by subscription management service 10, shown in FIG. 1A. When reconfigured, managed system 150 may provide a solution which may be provided with a software stack hosted by managed system 150. Managed system 150 may be reconfigured by, for example, deploying different software stacks, startup management entities, configuration of the operation of hardware/software components, and/or enabling/disabling hardware components.

In addition (and/or alternatively) to any of the components shown in FIG. 5, managed system 150 may include startup manager 151, operation manager 152, applications 154, hardware resources 156, and local subscription manager 158. Each of these components is discussed below.

Startup manager 151 may manage placement of managed system 150 in an operating state conducive to operation of applications 154. For example, after managed system 150 is power cycled, managed system 150 may not be in a state in which application 154 may operate. To enter the operating state, managed system 150 may perform any number processes such as (i) a power on self-test, (ii) performing an inventory of hardware resources 156, and (iii) beginning execution of and/or handing off operation management of managed system 150 to operation manager 152. Startup manager 151 may be implemented with, for example, a basic input output system (BIOS) or other type of startup management entity.

Operation manager 152 may generally manage operation of the component of managed system 150, except for local subscription manager 158. For example, operation manager 152 may be implemented with an operating system used to manage hardware resources 156 of managed system 150 to facilitate execution of applications 154.

To facilitate dynamic changes in solutions provided by operation manager 152 and/or applications 154, local subscription manager 158 may facilitate automatic deployment of software stacks and/or startup managers to managed system 150. The deployed software stacks may include all, or a portion, of operation manager 152 and applications 154. To ensure that only software stacks compatible with hardware resources 156 are deployed, local subscription manager 158 may maintain current information regarding hardware resources such as the types and quantities of hardware devices of hardware resources 156. Local subscription manager 158 may use the current information to identify compatibility between managed system 150 and various solutions, and enforce solution limitations (e.g., restrict) on managed system 150.

Applications 154 may provide all, or a portion, of the computer implemented services desired by a user, operator, or other person associated with managed system 150. Applications 154 may utilize hardware resources 156 to provide their respective functionalities. The type and quantity of applications 154 that may be hosted by managed system 150 may depend on hardware resources 156 (e.g., types and quantity of hardware devices).

Operation manager 152 may mediate presentation of hardware resources 156 to applications 154 by, for example, scheduling use, managing discontinuous access, and/or performing other actions to coordinate use of hardware resources 156 by applications 154 (and/or other entities). Consequently, the operation of applications 154 may be predicated on the operation of operation manager 152 as well as capabilities of hardware resources 156.

Figure 1D:
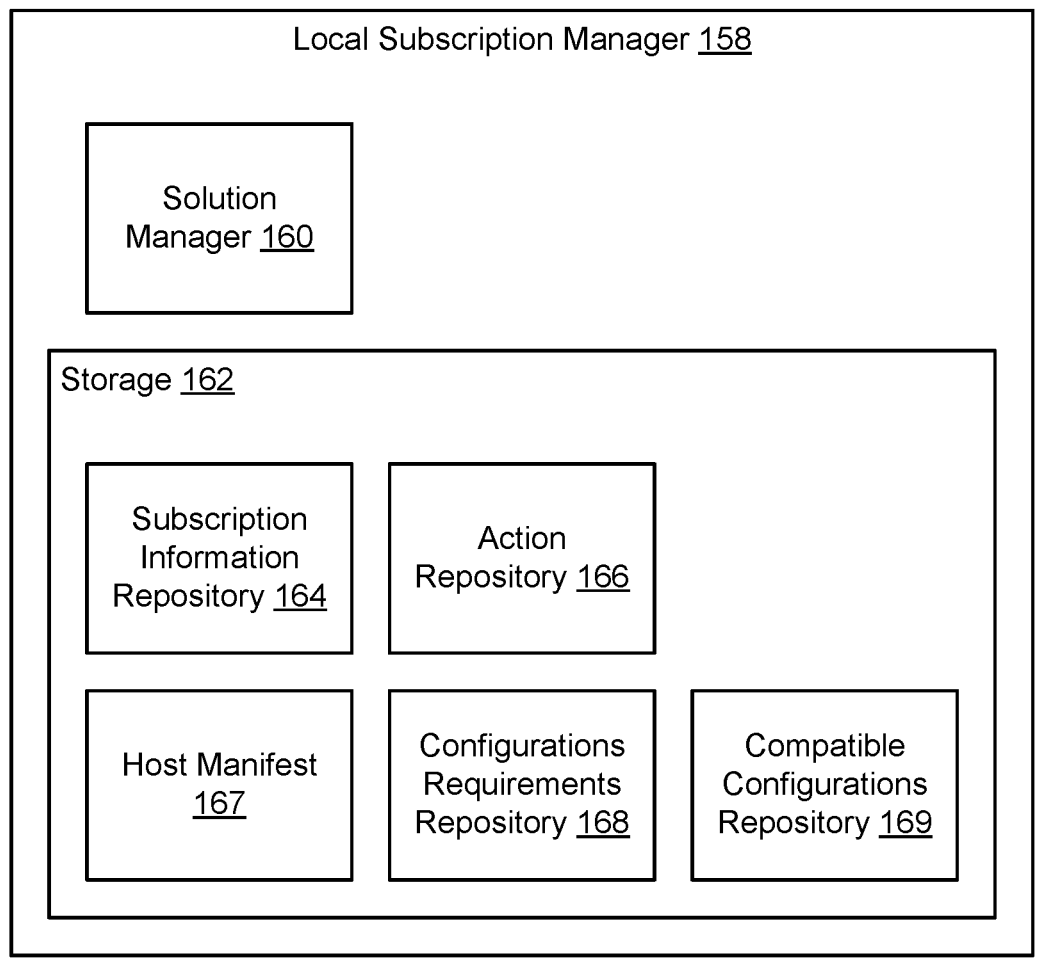
FIG. 1D shows a block diagram illustrating a local subscription manager in accordance with an embodiment.
Figure 1E:
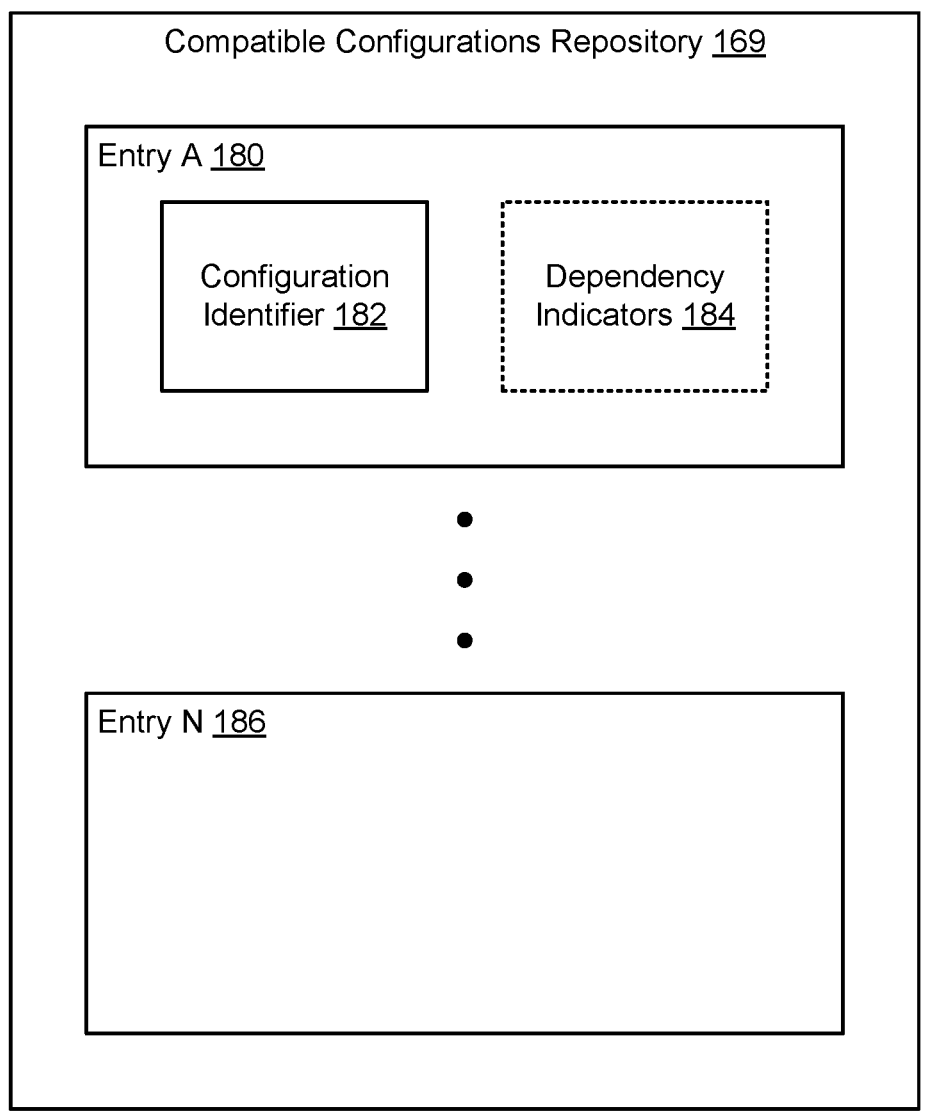
FIG. 1E shows a block diagram illustrating a compatible configurations repository in accordance with an embodiment.

The (successful) operation of any of startup manager 151, operation manager 152, and applications 154 may depend on any of these components, and/or components hosted by other managed systems. Consequently, subscriptions for any of these entities may also be dependent on other subscriptions. Refer to FIG. 1E for additional details regarding subscription dependencies.

In an embodiment, one or more of startup manager 151, operation manager 152, and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of startup manager 151, operation manager 152, and applications 154. One or more of startup manager 151, operation manager 152, and applications 154 may be implemented using other types of hardware devices without departing embodiment disclosed herein.

In an embodiment, one or more of startup manager 151, operation manager 152, and applications 154 is implemented using a processor adapted to execute computing code stored on a persistent storage that when executed by the processor performs the functionality of one or more of startup manager 151, operation manager 152, and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of startup manager 151, operation manager 152, applications 154, and/or other entities not shown in FIG. 1C. As part of their respective operation, hardware resources 156 may host firmware and/or may otherwise be programmable to facilitate their respective operation.

Various changes in subscriptions may cause various portions of hardware resources 156 to be enabled or disabled. Consequently, even though physical hardware may be present in managed system 150, some of the physical hardware may not be usable even though it could be usable. Accordingly, information regarding the physical location of hardware of managed system 150 may not be used to accurately determine the actual capabilities of managed system 150, since any quantity of hardware resources 156 may not actually be usable (e.g., may be depowered).

Local subscription manager 158 may provide subscription management services. Subscription management services may include (i) identifying solution compatibilities (and corresponding subscription compatibilities) of managed system 150, (ii) identifying solution and/or subscription dependencies, and (iii) limiting configuration of managed system 150 based on the compatibilities and/or dependencies. To do so, local subscription manager 158 may provide information regarding the subscription capabilities and dependencies to a deployment manager. The deployment manager may utilize the information to manage configuration of any number of managed systems.

By providing its functionality, local subscription manager 158 may manage the configuration, behavior, and/or functionality of managed system 150 in a manner that automatically conforms it to match that expected by subscription management service 10 (e.g., to match those solutions to which managed system 150 is subscribed).

To facilitate subscription based management of managed systems, local subscription manager 158, subscription management service 10, and/or deployment manager 100 may cooperate to enforce subscriptions on managed system 150. Local subscription manager 158, subscription management service 10, and/or deployment manager 100 may also perform one or more authentications of one another and/or communications from these components to prevent other entities from interfering with the cooperative operation of local subscription manager 158, subscription management service 10, and/or deployment manager 100 for managed system management purposes.

For example, these components may perform a public-private key exchange and/or exchange bearer tokens (or other types of authentication information). When communications are transmitted between these components, the communications may include authentication information such as the bearer tokens allowing for each of these components to distinguish communications that are actually from the other device from other components (e.g., such as spoofed communications that are made to appear to be from one of these devices but may actually originate from another device that may be attempting to disrupt the operation of these components).

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to load software stacks on managed system, obtain information regarding hardware resources 156, etc.

In an embodiment, the management controller includes a separate communication interface (e.g., from that of a communication interface of managed system 150) through which it communicates with subscription management service 10 and/or deployment manager 100. In an embodiment, the management controller uses the same communication interface which managed system 150 uses to communicate with other devices. Either of these communication interface may facilitate communications with communication system 30, and devices connected to communication system 30 such as subscription management service 10 or deployment manager 100. The management controller may present itself as a separate device to other entities (e.g., which may be associated with its own network endpoint).

When providing its functionality, local subscription manager 158 may perform all, or a portion, of the methods and operations illustrated in FIGS. 2-4C. Refer to FIG. 1D for additional details regarding local subscription manager 158.

While illustrated in FIG. 1C with a limited number of specific components, a managed system may include additional, fewer, and/or different components without departing from embodiments disclosed herein.

Turning to FIG. 1D, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include solution manager 160 and storage 162. Each of these components is discussed below.

Solution manager 160 may include functionality to (i) obtain information regarding hardware resources of a host managed system, (ii) identify solution (e.g., corresponding configurations) compatibilities of the host managed system based on the hardware resources information and information included in configurations requirements repository 168, (iii) enforce changes in solution compatibilities of the host managed system on the host managed system over time, (iv) service subscription updates by, for example, adding information regarding subscriptions to subscription information repository 164 and enforcing the subscriptions on the host managed system (e.g., thereby effectuating a change in subscription), and/or (v) notify other entities of subscription change completions.

In an embodiment, solution manager 160 is implemented using a hardware device including circuitry. The hardware device may be, for example, a digital signal processor, a field programmable gate array, or an application specific integrated circuit. The circuitry may be adapted to cause the hardware device to perform the functionality of solution manager 160. Solution manager 160 may be implemented using other types of hardware devices without departing embodiment disclosed herein.

In one embodiment, solution manager 160 is implemented using a processor adapted to execute computing code stored on a persistent storage that when executed by the processor performs the functionality of solution manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a device that hosts local subscription manager 158.

Storage 162 may store data structures including subscription information repository 164, action repository 166, host manifest 167, configurations requirements repository 168, and compatible configurations repository 169.

Subscription information repository 164 may be implemented with one or more data structures that store information regarding subscriptions for a managed system that hosts local subscription manager 158. The information may include, for example, the subscriptions to be enforced on the host managed system, limitations on the subscriptions (e.g., duration based, use based, etc.), and/or disablement actions for the subscriptions. The disablement actions may be implemented with code blocks that may be pushed to the host managed system for execution. When executed, the host managed system may perform the disablement actions which may, for example, cause various hardware/software components to be enabled/disabled, and/or reconfigured (e.g., through reformatting of storage device, modification of settings, etc.).

Action repository 166 may be implemented with one or more data structures that store information regarding actions that may be performed to force a device hosting local subscription manager 158 to comply with various subscriptions. The actions may, for example, be keyed to information in subscription information repository 164 such that corresponding actions from action repository 166 may be identified. Actions from action repository 166 may be performed by solution manager 160 when a condition is met, such as a subscription limit being exceeded or a new subscription being obtained.

In an embodiment, action repository 166 includes at least one set of actions keyed to changes in subscription of a management entity for the host managed system. The actions may include (i) restarting/initializing a host managed system, (ii) after doing so, interrupting a normal startup process performed by the host managed system prior to the host managed system booting to a management entity, (iii) while the normal startup process is interrupted, dynamically configuring a management entity, and/or (iv) resuming the normal startup process such that the host managed systems hands off, after startup, operation of the managed system to the dynamically configured management entity. In this manner, the management entity utilized by a host managed system may be dynamically changed over time to meet the needs of users of the host managed system.

Host manifest 167 may be implemented with one or more data structures that store information regarding hardware resources of a host managed system. The information may include, for example, a list of hardware devices, the type of each hardware device, capabilities of each hardware devices, and/or other information regarding the hardware resources of the host managed system. Host manifest 167 may be updated over time to ensure that it is likely to include accurate information.

Configurations requirements repository 168 may be implemented with one or more data structures that store information regarding hardware resource requirements for any number of configurations (e.g., to which a host managed system may be subscribed) for corresponding solutions. The information may include, for example, a list of solutions and corresponding hardware resources required for each of the solutions including, for example, list of hardware devices, the type of each hardware device, capabilities of each hardware device, and/or other information regarding the hardware resources that should be available for a solution to be implemented by a managed system. Similar information may be included regarding software components necessary for various solutions. Further, similar information may be include regarding functionalities of other managed systems may need to be available for various solutions.

Compatible configurations repository 169 may be implemented with one or more data structures that store information regarding configurations which a host managed system is likely to be able to implement. The information may include, for example, a list of identifiers of the configurations (that correspond to solutions), identifiers of software stacks for each identified configurations, information regarding where images of applications or other entities for the identified software stacks may be obtained, and/or other types of information usable to allow local subscription manager 158 to identify whether a solution corresponding to a configuration is compatible with a host managed system and/or allow local subscription manager 158 to implement a solution (e.g., by automatically retrieving and deploying a software stack).

Solution manager 160 may provide a deployment manager with information from compatible configurations repository 169 such that the deployment manager may be able to ascertain whether the host managed system may be able to implement a solution and, if not, which requirements (e.g., dependencies) for the solution are not yet met. Refer to FIG. 1E for additional details regarding dependencies.

While various data structures have been illustrated in and described with respect to FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to local subscription manager 158 (e.g., in a storage of a deployment manager or subscription management service) in a manner that is still accessible to local subscription manager 158.

While illustrated in FIG. 1D with a limited number of specific components, a local subscription manager may include additional, fewer, and/or different components without departing from embodiments disclosed herein.

Turning to FIG. 1E, a diagram of compatible configuration repository 169 in accordance with an embodiment is shown. Compatible configuration repository 169 may include information regarding the configurations compatible with a host managed system.

For example, compatible configuration repository 169 may be implemented as a lookup data structure such as a list that includes any number of entries 180, 186. Each of the entries may correspond to a configuration associated with a solution.

Each entry may, for example, include a configuration identifier 182 that identifies the configuration and/or associated solution. Each entry may also indicate whether the identified solution/configuration is compatible with the host managed system (e.g., via a flag or other bit pattern).

Each entry may also include one or more dependency indicators 184 (drawn with dashed outline to indicate that all entries may not include such indicators). Dependency indicators 184 may indicate which solutions, function, and/or other characteristics of the host managed system and/or other managed systems of a deployment are required for the identified solution/configuration.

For example, an entry may include identifier of a data storage solution. The entry may also include a dependency indicator that indicates that another managed system must be available to provide deduplication services for the data storage solution. Dependency indicators 184 may indicate any number of such dependencies for each corresponding solution.

Compatible configuration repository 169 may include any number of entries corresponding to any number of potential solutions to which any managed system may be subscribed. To facilitate subscription management at a deployment level, information from compatible configurations repository 169 may be provided to a deployment manager, which may obtain similar information for any number of managed systems, along with subscription information for the respective managed system. Consequently, the deployment manager may have access to a deployment level view of the managed systems, their respective subscriptions, capabilities, and compatibilities.

While compatible configurations repository 169 has been illustrated as including specific types and quantities of information, a compatible configurations repository may include additional, different, and/or less information. Likewise, while described with respect to a list, compatible configurations repository 169 may be implemented with other types of data structures without departing from embodiments disclosed herein.

Figure 1F:
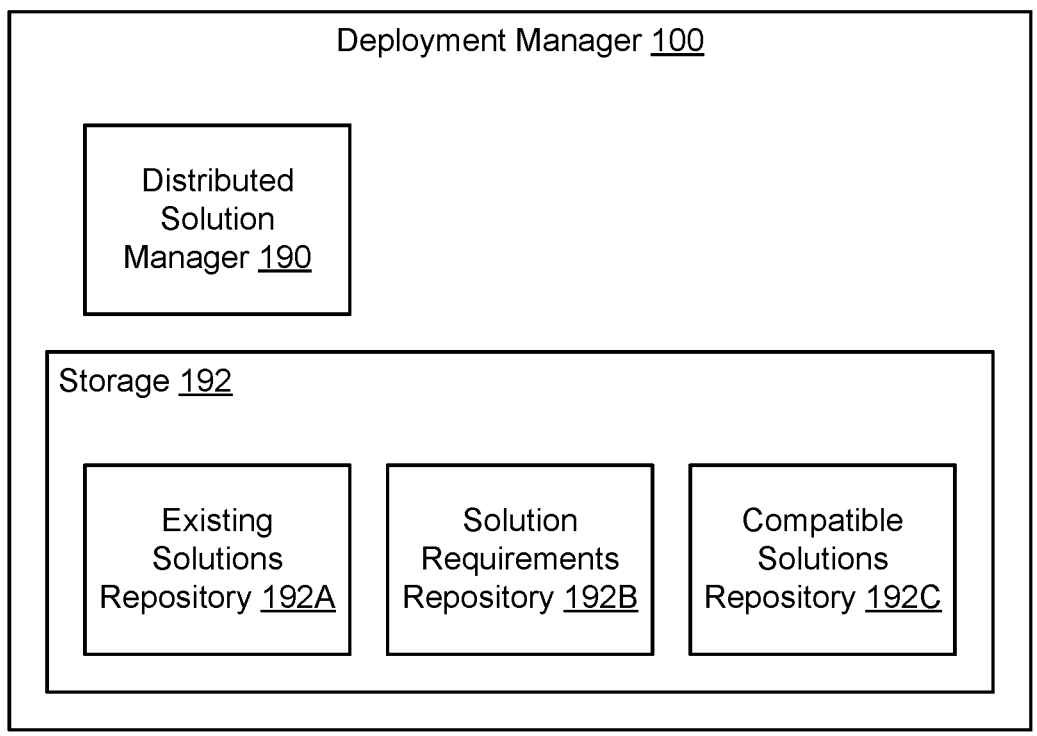
FIG. 1F shows a block diagram illustrating a deployment in accordance with an embodiment.

Turning to FIG. 1F, a block diagram of deployment manager 100 in accordance with an embodiment is shown. Deployment manager 100 may provide deployment level subscription management services.

To do so, deployment manager 100 may include distributed solution manager 190 and storage 192. Each of these components is discussed below.

Distributed solution manager 190 may manage solution implementation at a deployment level through selective subscription management. The distributed solution manager 190 may (i) obtain subscription updates (e.g., from a subscription management service) for managed systems, (ii) determine whether the subscription updates are compatible with the corresponding managed systems (e.g., using information included in compatible solutions repository 192C and/or existing solutions repository 192A), and (iii) either implement the subscriptions through subscription enforcement (e.g., when the subscriptions are determined as being compatible with the corresponding managed systems) or proactively remediate solution deployment failures when incompatible subscriptions are identified.

To remediate the solution deployment failure, distributed solution manager 190 may attempt to modify the operation of one or more managed systems such that the dependencies of the incompatible subscriptions are resolved. To do so, distributed solution manager 190 may cooperate with a subscription management service to identify the unavailable solutions which render the subscriptions incompatible, present such information to managers or other persons, and request permission to expand existing subscriptions such that the unavailable solutions are rendered available, thereby eliminating the incompatibilities for the subscriptions. If permission to expand the existing subscriptions is not received, then distributed solution manager 190 may deploy impaired solutions corresponding to the subscriptions or simply treat the subscription the subscription updates as having failed (e.g., solution deployment failures).

When providing its functionality, distributed solution manager may perform all, or a portion, of the methods and processes illustrated in FIGS. 2-4C.

In an embodiment, storage 192 is implemented using physical devices that provide data storage services (e.g., storing data and providing copies of previously stored data). The devices that provide data storage services may include hardware devices and/or logical devices. For example, storage 192 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 192 may include a memory device (e.g., a dual in line memory device) in which data is stored and from which copies of previously stored data are provided. In another example, storage 192 may include a persistent storage device (e.g., a solid-state disk drive) in which data is stored and from which copies of previously stored data is provided. In a still further example, storage 192 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 192 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 192 may store data structures including existing solutions repository 192A, solution requirements repository 192B, and compatible solutions repository 192C.

Existing solutions repository 192A may be implemented with one or more data structures that include information regarding subscriptions implemented with managed systems of a deployment. For example, existing solutions repository 192A may include a list of identifiers of subscriptions implemented by each of the managed systems.

Solutions requirements repository 192B may be implemented with one or more data structures that include information regarding requirements for implementing any number of subscriptions. For example, the solution requirements repository 192B may specify dependencies for any number of subscriptions. The dependencies may indicate subscriptions that may be implemented by a same and/or different managed system.

Compatible solutions repository 192C may be implemented with one or more data structures that include information regarding subscriptions that are compatible with each managed system of a deployment. For example, compatible solutions repository 192C may include a list of compatible subscriptions for each managed system.

Any of the information in any of repositories 192A, 192B, and 192C may dynamically change over time as subscriptions are implemented and/or terminated. By virtue of being part of a distributed control plane, deployment manager 100 may have access to different information from subscription management service 10 (e.g., due to time delays in information distribution in a distributed system), or may be designed to include different information in combination with operation of subscription management service 10.

While various data structures have been illustrated and described in FIG. 1F with specific structures, any of the data structures may be implemented with different structures (e.g., lists, tables, linked lists, databases, etc.), stored in different locations, spanned across any number of devices, and/or may include additional, less, and/or different information without departing from embodiments disclosed herein.

While illustrated in FIG. 1F with a limited number of specific components, a deployment manager may include additional, fewer, and/or different components without departing from embodiments disclosed herein.

Figure 2:
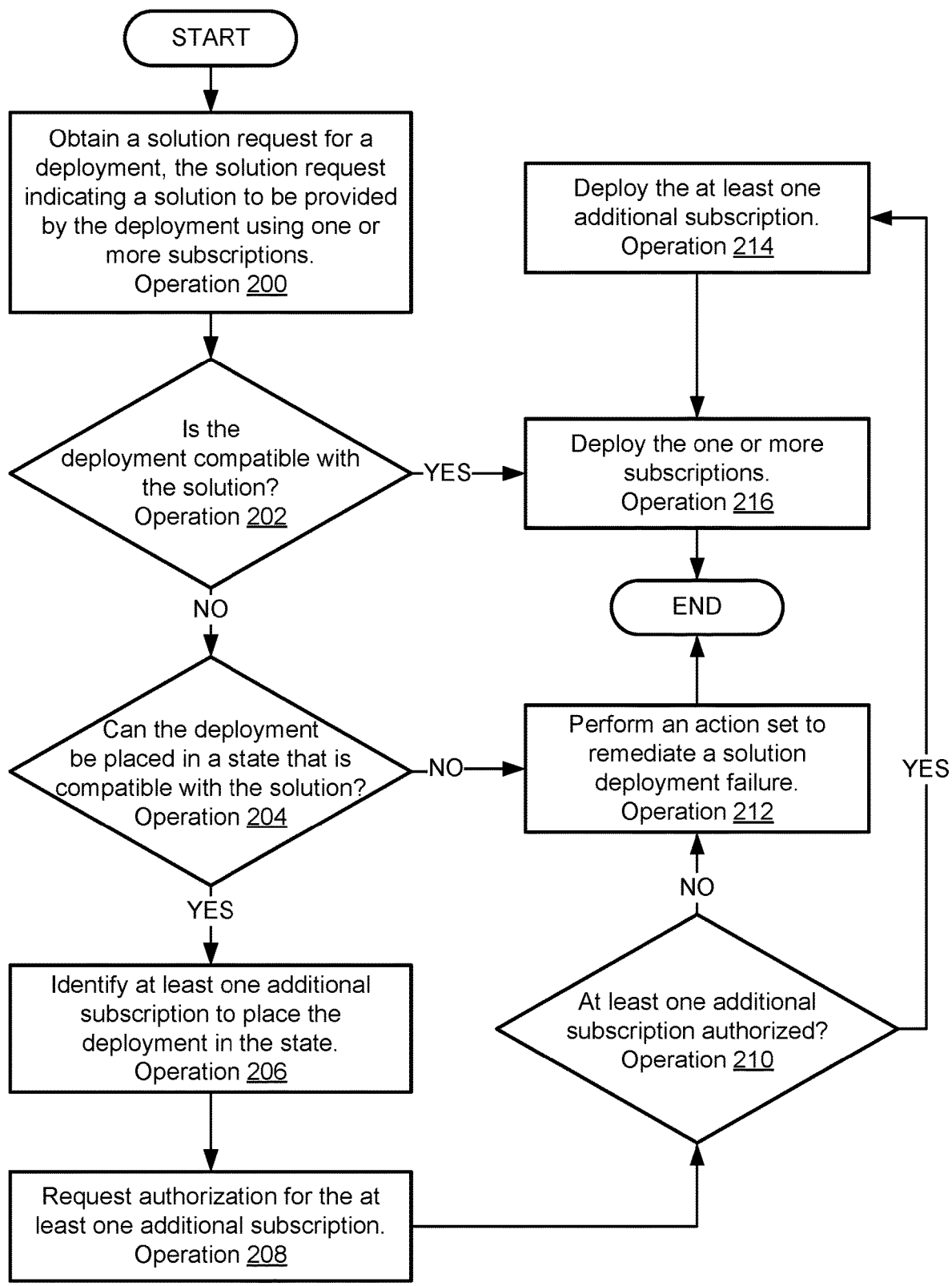
FIG. 2 shows a flow diagram illustrating a method of servicing solution requests in accordance with an embodiment.
Figure 3:
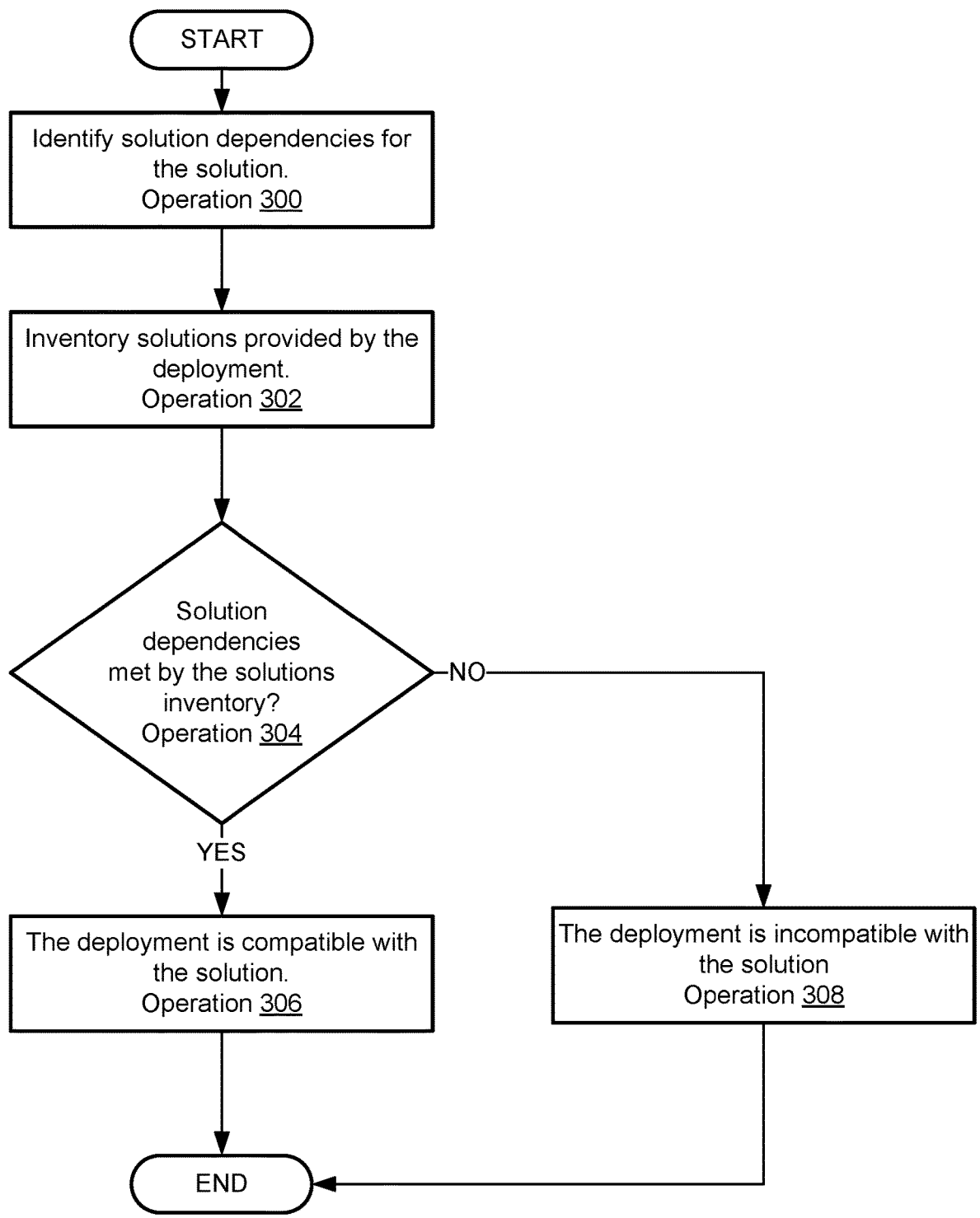
FIG. 3 shows a flow diagram illustrating a method of determine deployment compatibilities in accordance with an embodiment.

As discussed above, the components of FIG. 1A may perform various methods to provide computer implemented services using managed systems. FIGS. 2-3 illustrate examples of methods that may be performed by the components of FIG. 1A. For example, a local subscription manager of a managed system, a deployment manager, and/or a subscription management service may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of servicing subscription updates in accordance with an embodiment is shown. The method illustrated in FIG. 2 may be performed a person selects a different solution for deployment to managed systems of a deployment.

At operation 200, a solution request for a deployment is obtained. The solution request may indicate a solution to be provided by the deployment using one or more subscriptions. The solution request may be obtained via one or more messages from a subscription management service.

At operation 202, a determination is made regarding whether the deployment is compatible with the solution. For example, the one or more subscriptions may be compared to solution compatibilities for the deployment. If any of the one or more subscriptions are incompatible with the solution compatibilities, then it may be determined that the solution is incompatible with the deployment.

If it is determined that the deployment is compatible with the solution, then the method may proceed to operation 216. Otherwise, the method may proceed to operation 204.

At operation 204, a determination is made regarding whether the deployment may be placed in a state that is compatible with the solution. The determination may be made, for example, by comparing dependencies associated with the one or more subscriptions with the capabilities of the managed systems. If the comparison indicates that any of the dependencies for the one or more subscriptions cannot be implemented by the managed systems, then it may be determined that the deployment cannot be placed in the compatible state.

If the deployment cannot be placed in the compatible state, then the method may proceed to operation 212. Otherwise, the method may proceed to operation 206 following operation 204.

At operation 206, at least one additional subscription to place the deployment in the compatible state is identified. The identification may be made based on the dependencies associated with the one or more subscriptions (e.g., those that, at operation 202, were determined as not being compatible with the solution). The dependencies may indicate or specify additional subscriptions (e.g., at least one addition subscription) that must be met for the one or more subscriptions to be successfully implemented. Any number of such additional subscriptions may be identified (e.g., because any subscription may have any number of dependencies).

At operation 208, authorization for the at least one additional subscription is requested. The authorization may be requested by, for example, sending a message to a subscription management service. In response, the subscription management service may present a graphical user interface to a user (e.g., that initiated the solution request of operation 200) indicating the additional subscriptions, cost information for the subscriptions, and/or other types of information. The graphical user interface my include widgets or other elements for obtaining user feedback and through which the user may indicate whether the additional subscriptions are authorized. The subscription management service may collect the user feedback and notify the deployment manager regarding whether the at least one additional subscriptions are authorized.

At operation 210, a determination is made regarding whether the at least one additional subscription is authorized. The determination may be made based on the response to the authorization request of operation 208. If it is determined that the at least one additional subscription is authorized, then the method may proceed to operation 214. Otherwise the method may proceed to operation 212. Proceeding to operation 212 may indicate that a user has been presented with one or more additional subscriptions which are necessary for implementation of the one or more subscriptions for the solution request, and the user has declined the additional subscriptions such that the deployment will remain incompatible with the solution.

At operation 212, an action set to remediate a solution deployment failure is performed. In other words, because, at operation 212, the deployment may not be compatible with the solution, the solution request of operation 200 and subsequent action may be treated as a solution deployment failure. To remediate the solution deployment failure, any number of actions may be performed. The actions may include, for example, (i) refusing to service the solution request, (ii) attempting to service the solution request in a partial manner (e.g., through deployment of an impaired solution by virtue of the deployment not meeting all of the dependencies for the solution), and/or (iii) performing other actions to reduce the impact of the solution deployment failure on the user's use of the managed systems.

For example, the solution request may partially serviced by (i) notifying the user that the solution is incompatible with the deployment, (ii) requesting to proceed with the deployment even though all, or a portion, of the functionality associated with the one or more subscriptions may be impaired, and (iii) if the request to proceed is granted, enforcing the one or more subscriptions (e.g., by sending them to corresponding local subscription managers for implementation and enforcement on the respective managed systems).

The method may end following operation 212.

Returning to operation 210, the method may proceed to operation 214 following operation 210 when it is determined that the at least one additional subscription is authorized. Proceeding to operation 214 may indicate that a user has been presented with one or more additional subscriptions which are necessary for implementation of the one or more subscriptions for the solution request, and the user agreed to the additional subscriptions such that the deployment will be modified for compatibility with the solution.

At operation 214, the at least one additional subscription is deployed. The at least one additional subscription may be deployed by, for example, sending the at least one additional subscription to local subscription managers of corresponding managed systems. The local subscriptions managers may, based on the at least one addition subscription: (i) enable/disable hardware components of the host managed system, (ii) modify operation of a startup manager of the host managed system, (iii) modify operation of an operation manager of the host managed system, and/or (iv) modify a solution stack of the host managed system. By doing so, the corresponding managed system may begin to operate in a manner compatible with the solution.

At operation 216, the one or more subscriptions are deployed. At operation 216, the managed system may now meet all of the dependencies of the one or more subscriptions. The one or more subscription may be deployed by, for example, sending the one or more subscription to local subscription managers of corresponding managed systems. The local subscriptions managers may, based on the one or more subscription: (i) enable/disable hardware components of the host managed system, (ii) modify operation of a startup manager of the host managed system, (iii) modify operation of an operation manager of the host managed system, and/or (iv) modify a solution stack of the host managed system. By doing so, the corresponding managed system may begin to operate in a manner compatible with the solution.

In operations 214-216, different managed system may be modified. For example, a subscription update for a first managed system may have a dependency with respect to operation of a second managed system. To resolve the dependency, an additional subscription for the second managed system may be deployed to place the first managed system into compatibility with the subscription update. In other scenarios, the same managed system may need to be modified.

The method may end following operation 216.

Returning to operation 202, the method may proceed to operation 216 following operation 202. Proceeding to operation 216 following operation 202 may indicate that all of the dependencies of the one or more subscriptions were met by the managed systems of the deployment. Consequently, the managed systems may not need to be modified for compatibility with the one or more subscriptions when the yes path is followed after operation 202.

Turning to FIG. 3, a flow diagram illustrating a method of determining deployment compatibility with a solution in accordance with an embodiment is shown. The method illustrated in FIG. 3 may be performed during operation 202 of FIG. 3.

At operation 300, solution dependencies for the solution are identified. The solution dependencies may be identified based on the dependencies of the subscriptions that must be implemented for the solution to be provided. The dependencies may be identified by, for example, performing lookups in data structures that specify the dependencies for each subscription. The dependencies may indicate that subscriptions that may be implemented by the deployment for the deployment to be compatible with the solution.

At operation 302, solutions provided by the deployment are inventoried. The inventoried solutions may specify the subscriptions to which each managed system of the deployment is subscribed. Such subscriptions may be used as a proxy for actual functionalities which may be the actual basis for solution compatibility.

At operation 304, a determination is made regarding whether the solution dependencies are met by the solutions inventory. The determination may be made by identifying whether the solutions inventory include a managed system having the subscriptions specified by the solution dependencies. For example, the solution dependencies may be a list of managed systems and their respective subscriptions necessary for the solution to be provided. If the solutions inventory does not indicate the presence of managed systems having the listed subscriptions, then it may be determined that the solution dependencies are not met by the solutions inventory.

If it is determined that the solution dependencies are not met by the solutions inventory, then the method may proceed to operation 308. Otherwise the method may proceed to operation 306.

At operation 306, it is determined that the deployment is compatible with the solution. The method may end following operation 306.

Returning to operation 304, the method may proceed to operation 308 following operation 304 when it is determined that the solution dependencies are not met by the solution inventory.

At operation 308, it is determined that the deployment is incompatible with the solution.

The method may end following operation 308.

Thus, via the methods illustrated in FIGS. 2-3, a distributed system may be made more likely to successfully provided computer implemented services by proactively addressing compatibility issues and resolving them ahead of solution deployment. When doing so, the distributed system may utilize a distributed control plane that empowers entities more likely to have access to accurate information to honor or reject requests from other entities that are less likely to have access to the accurate information.

Figure 4A:
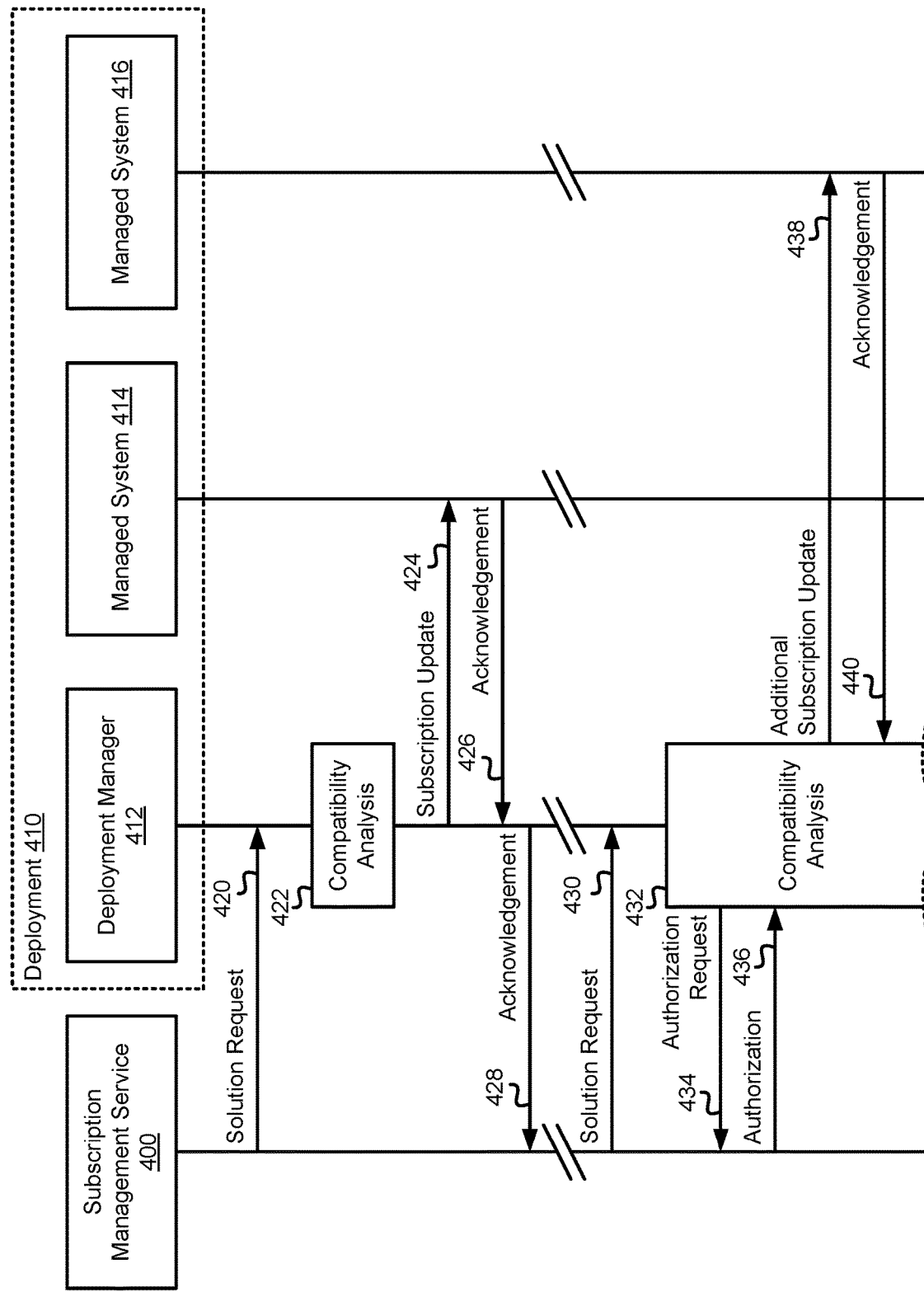
FIGS. 4A-4C show diagrams illustrating interactions between and actions of components of a system in accordance with an embodiment.
Figure 4B:
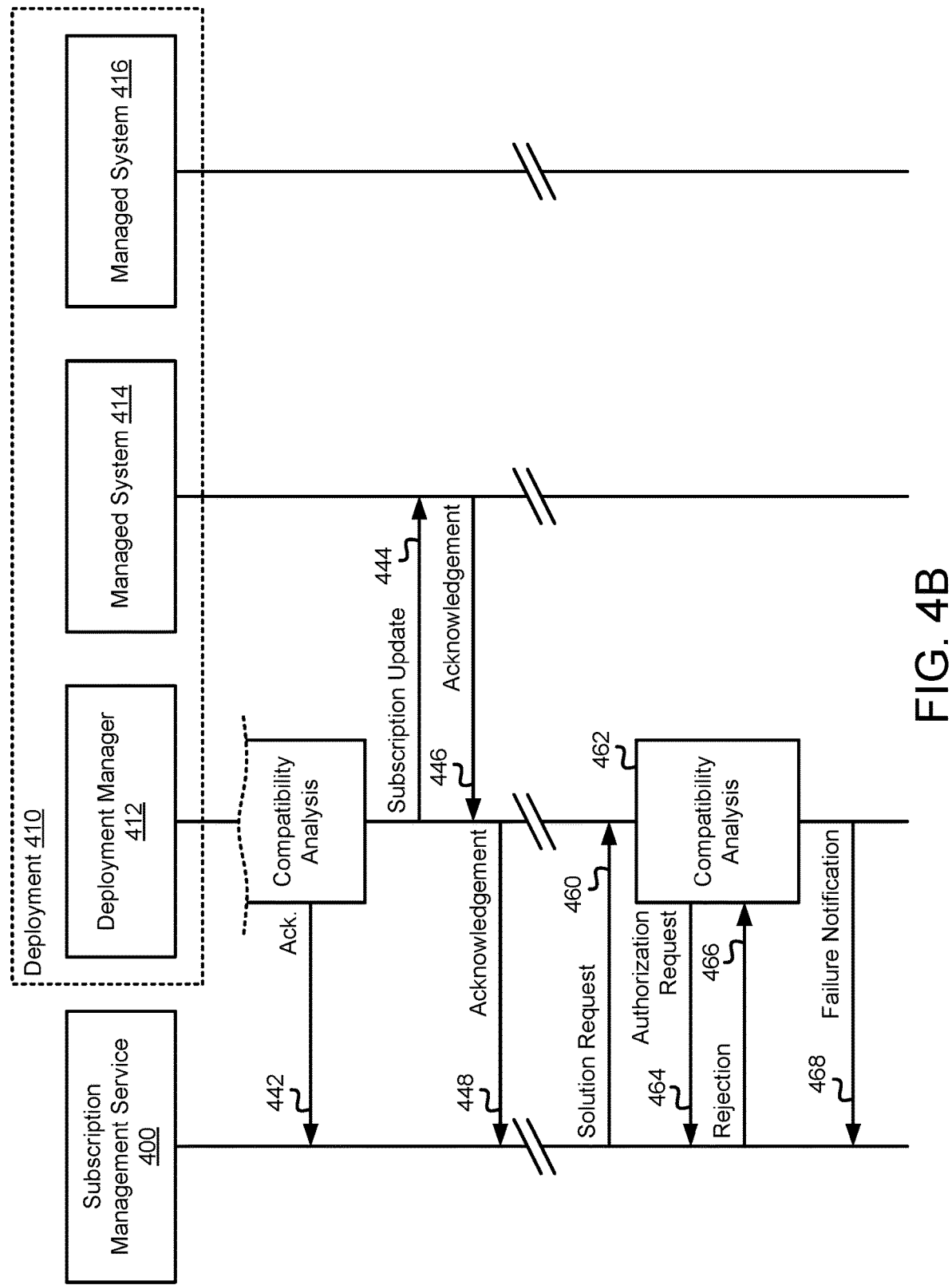
Figure 4C:
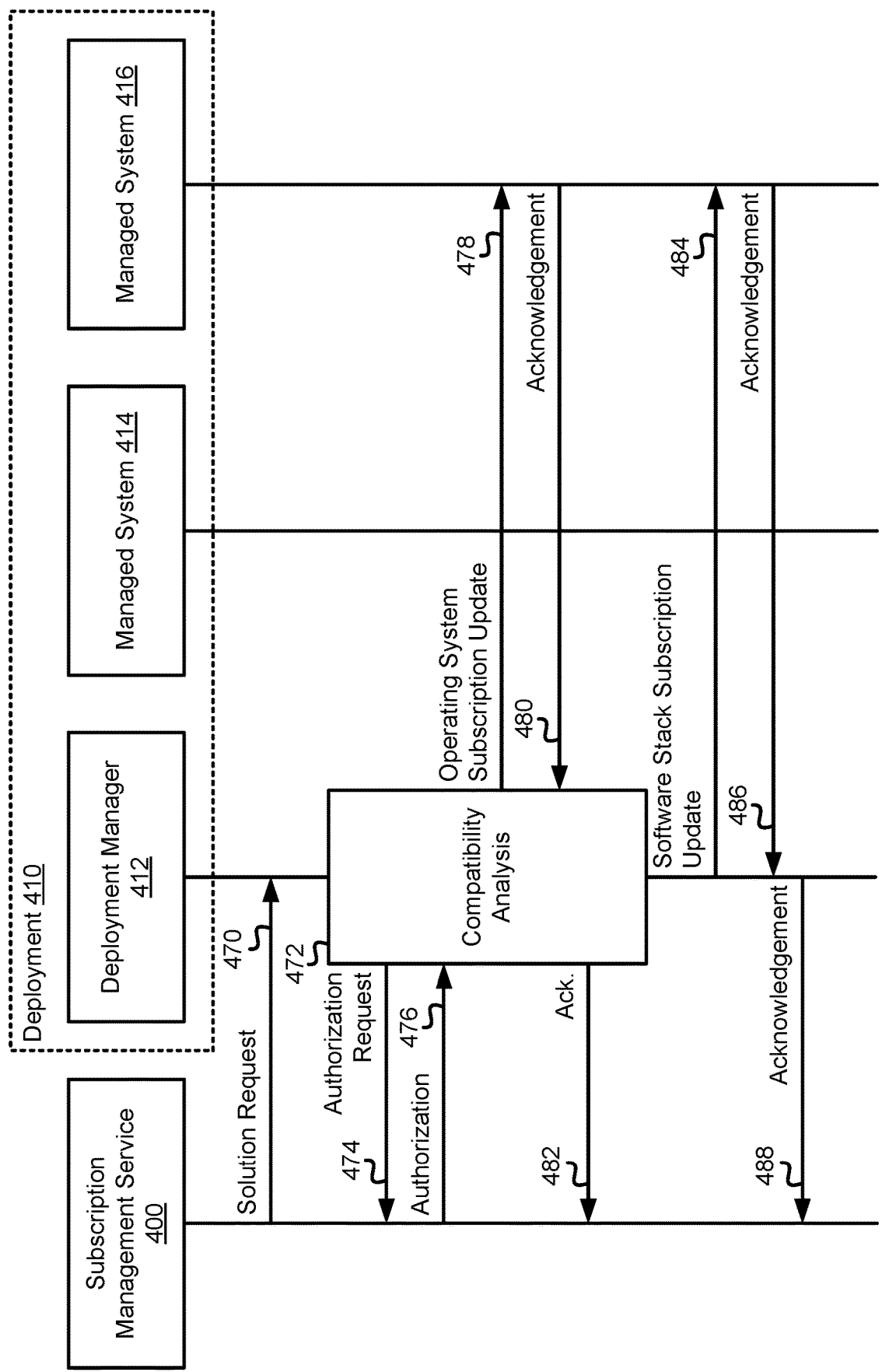

Turning to FIGS. 4A-4C, interaction diagrams in accordance with an embodiment are shown. In these figures, a system similar to that illustrated in FIG. 1A may be operating. In these figures, operations performed by the respective components are shown along the lines extending from the corresponding boxes labeled with the component names. Operations impacting multiple components, such as data transmissions between the components, are shown using arrows extending between these lines. Generally, the operations are ordered temporally with respect to one another (e.g., with earlier performed operations being located towards a top of the page and later operations being located towards a bottom of the page). However, it will be appreciated that the operations may be performed in other orders from those illustrated herein.

Turning to FIG. 4A, consider a scenario where subscription management service 400 is tasked with managing deployment 410. Deployment 410 may include deployment manager 412 and managed systems 414, 416 which may provide different services depending on their respective subscriptions.

At a first point in time, a user indicates to subscription management service 400 that deployment 410 should provide a new solution. In response, at block 420, subscription management service sends a solution request to deployment manager 412 for the new solution.

In response, at block 422, deployment manager 412 performs a compatibility analysis for the new solution. Through the compatibility analysis, deployment manager 412 determines that the new solution has no dependencies that are not met by managed system 414. Based on the determination, at block 424, deployment manager 412 sends a subscription update to a local subscription managed hosted by managed system 414, which implements the subscription to cause managed system 414 to provide the new solution. Once implemented, the hosted local subscription manager, at block 426, generates and sends an acknowledgement to deployment manger 412. Deployment manager 412, at block 428, relays the acknowledgement to subscription management service 400 to indicate that the new solution is being provided by managed system 414.

At a second point in time the user may again indicate to subscription management service 400 that an additional solution should be provided by deployment 410. In response, at block 430, subscription management service sends a solution request to deployment manager 412 for the additional solution.

In response, at block 432, deployment manager 412 performs a compatibility analysis for the new solution. Through the compatibility analysis, deployment manager 412 determines that the additional solution has a dependency that is not met by managed systems 414, 416, but could be met if a further subscription was implemented by managed system 416.

Based on the determination, at block 434, deployment manager 412 sends an authorization request to subscription management service 400 for the further subscription. Subscription management service 400 presents the further subscription to the user and obtains the user's authorization for the subscription (in this example, the user may have rejected the request in other scenarios).

In response, subscription management service 400, at block 436, sends an authorization to deployment manager 412 for the further subscription.

Based on the authorization, at block 438, deployment manager 412 sends an additional subscription update (more than that required to service solution request of block 430) to a local subscription managed hosted by managed system 416, which implements the subscription to cause managed system 416 to provide the dependency necessary for the solution requested in block 430. Once implemented, the hosted local subscription manager, at block 440, generates and sends an acknowledgement to deployment manger 412.

Turning to FIG. 4B, deployment manager 412, at block 442 relays the acknowledgement to subscription management service 400 to indicate that the further subscription has been implemented by managed system 416. At this point, the compatibility analysis may end because deployment 410 has been placed into a state compatible with the solution.

At block 444, deployment manager 412 sends a subscription update to a local subscription managed hosted by managed system 414, which implements the subscription to cause managed system 414 to provide the additional solution from the request of block 430. Once implemented, the hosted local subscription manager, at block 446, generates and sends an acknowledgement to deployment manger 412. Deployment manager 412, at block 448, relays the acknowledgement to subscription management service 400 to indicate that the additional solution is being provided by managed system 414.

At a third point in time the user again indicates to subscription management service 400 that a third solution should be provided by deployment 410. In response, at block 460, subscription management service sends a solution request to deployment manager 412 for the third solution.

In response, at block 462, deployment manager 412 performs a compatibility analysis for the third solution. Through the compatibility analysis, deployment manager 412 determines that the additional solution has a dependency that is not met by managed systems 414, 416, but could be met if a significant subscription (e.g., costly in terms of computing resources, computing load, and/or financial cost) was implemented by managed systems 414, 416.

Based on the determination, at block 464, deployment manager 412 sends an authorization request to subscription management service 400 for the significant subscription. Subscription management service 400 presents the further subscription to the user, but the user denies authorization for the significant subscription.

In response, subscription management service 400, at block 466, sends a rejection to deployment manager 412 for the significant subscription. Consequently, deployment manager 412 completes the compatibility with a conclusion that the third subscription is incompatible with deployment 410. In response, at block 468, deployment manager 412 sends a failure notification to subscription management service 400 for the solution request of block 460. Deployment manager 412 does not attempt to implement the subscriptions for the third solution.

Turning to FIG. 4C, at a fourth point in time, the user may again indicate to subscription management service 400 that a fourth solution should be provided by deployment 410. The fourth solution implicates a subscription for a new software stack by a managed system. In response, at block 470, subscription management service sends a solution request to deployment manager 412 for the fourth solution.

In response, at block 472, deployment manager 412 performs a compatibility analysis for the fourth solution. Through the compatibility analysis, deployment manager 412 determines that the software stack subscription has a dependency that is not met by managed system 416, but could be met if a subscription for a different operating system was implemented by managed system 416.

Based on the determination, at block 474, deployment manager 412 sends an authorization request to subscription management service 400 for the operating system subscription. Subscription management service 400 presents the operating system subscription to the user and obtains the user's authorization for the subscription (in this example, the user may have rejected the request in other scenarios).

In response, subscription management service 400, at block 476, sends an authorization to deployment manager 412 for the further subscription.

Based on the authorization, at block 478, deployment manager 412 sends an operating system subscription update to a local subscription managed hosted by managed system 416, which implements the subscription to cause managed system 416 to host the operating system necessary for operation of the software stack. Once implemented, the hosted local subscription manager, at block 480, generates and sends an acknowledgement to deployment manger 412.

Deployment manager 412, at block 482 relays the acknowledgement to subscription management service 400 to indicate that the operating subscription has been implemented by managed system 416. At this point, the compatibility analysis may end because deployment 410 has been placed into a state compatible with the solution.

At block 484, deployment manager 412 sends a solution stack subscription update to a local subscription managed hosted by managed system 416, which implements the solution stack subscription to cause managed system 416 to host an instance of the software necessary to provide the solution requested in block 470. Once implemented, the hosted local subscription manager, at block 486, generates and sends an acknowledgement to deployment manger 412. Deployment manager 412, at block 488, relays the acknowledgement to subscription management service 400 to indicate that the fourth solution is being provided by managed system 414.

Thus, via the processes illustrated in FIGS. 4A-4C, embodiments disclosed herein may provide for the automated and distributed configuration of various managed systems in a distributed system. By doing so, inaccurate information in the distributed system may be less likely to negatively impact the computer implemented services provided by the distributed system.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of managed systems if the control layer for the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control plane used to manage the configuration of the distributed system may be far more resilient to malicious attacks.

Accordingly, embodiments disclosed herein may be provide for the improved operation of distributed system by improving resilience to malware or other types of third party attacks while still providing for configurability over time such that various types of desired solutions may be provided over time.

As discussed above, various components may be implemented with computing devices. For example, any of the components illustrated in FIGS. 1A-4C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS/iOS from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for managing computer-implemented services provided by managed systems, the computer-implemented method comprising:
    obtaining, by a deployment manager that manages the managed systems, a first solution request for the managed systems, wherein the first solution request indicates a first solution to be provided using at least one subscription;
    making, by the deployment manager, a first determination that the first solution is incompatible with the managed systems;
    in response to the first determination that the first solution is incompatible with the managed systems:
        making, by the deployment manager, a second determination that the managed systems may be made compatible with the first solution using at least one additional subscription;
    in response to the second determination that the managed systems may be made compatible with the first solution using the at least one additional subscription:
        obtaining, by the deployment manager, authorization for the at least one additional subscription;
        deploying, by the deployment manager, the at least one additional subscription to the managed systems based on the obtained authorization to enhance the managed systems with at least one new functionality; and
        deploying, by the deployment manager, the at least one subscription to the enhanced managed systems, wherein the at least one subscription is dependent on the at least one new functionality.

2. The computer-implemented method of claim 1, further comprising:
    obtaining, by the deployment manager, a second solution request for the managed systems, wherein the second solution request indicates a second solution to be provided using at least one other subscription;
    making, by the deployment manager, a third determination that the second solution is incompatible with the managed systems;
    in response to the third determination that the second solution is incompatible with the managed systems:
        making, by the deployment manager, a fourth determination that the managed systems may not be made compatible with the first solution using any other subscriptions; and
    in response to the fourth determination that the managed systems may not be made compatible with the first solution using the any other subscriptions:
        performing, by the deployment manager, an action set to remediate a solution deployment failure of the second solution.

3. The computer-implemented method of claim 2, wherein the action set comprises:
    notifying, by the deployment manager, a subscription manager of the solution deployment failure of the second solution, wherein the notification indicates a missing functionality of the managed systems that may not be remediated through subscription modifications.

4. The computer-implemented method of claim 3, wherein the action set further comprises:
    deploying, by the deployment manager, an additional managed system to the managed systems, wherein the additional managed system is capable of providing the missing functionality of the managed systems.

5. The computer-implemented method of claim 3, wherein the action set further comprises:
    deploying, by the deployment manager, an impaired solution in place of the second solution in response to receiving an authorization to deploy the impaired solution in place of the second solution, wherein the impaired solution provides a subset of functionality of the second solution due to the missing functionality of the managed systems; and
    registering, by the deployment manager, the deployed impaired solution with a subscription management system and the managed systems.

6. The computer-implemented method of claim 1, further comprising:
    obtaining, by the deployment manager, a second solution request for the managed systems, wherein the second solution request indicates a second solution to be provided using at least one other subscription;
    making, by the deployment manager, a third determination that the second solution is compatible with the managed systems; and
    in response to the third determination that the second solution is compatible with the managed systems:
        deploying, by the deployment manager, the at least one other subscription to the managed systems.

7. The computer-implemented method of claim 1, wherein deploying the at least one additional subscription to the managed systems comprises:
    enforcing, by the deployment manager using a first local subscription manager hosted by a first managed system of the managed systems, the at least one additional subscription on the first managed system of the managed systems.

8. The computer-implemented method of claim 7, wherein enforcing the at least one addition subscription on the first managed system of the managed systems comprises:
    modifying, by the deployment manager, an enablement of at least one hardware component of the first managed system of the managed systems;
    modifying, by the deployment manager, an operation of a startup manager of the first managed system of the managed systems;
    modifying, by the deployment manager, an operation of an operation manager of the first managed system of the managed systems; and
    modifying, by the deployment manager, an operation of a software stack of the first managed system of the managed systems.

9. The computer-implemented method of claim 8, wherein modifying the enablement of the at least one hardware component of the first managed system of the managed systems comprises:
    during a startup orchestrated by the startup manager of the first managed system of the managed systems:

depowering, by the deployment manager, a first hardware component of a plurality of hardware components, wherein the first hardware component of the plurality of hardware components is otherwise powered;

powering, by the deployment manager, a second hardware component of the plurality of hardware components, wherein the second hardware component of the plurality of hardware components is otherwise depowered; and completing, by the deployment manager, the startup to prevent the operation manager of the first managed system of the managed systems from utilizing the first hardware component of the plurality of hardware components and allow the operation manager of the first managed system of the managed systems to utilize the second hardware component of the plurality of hardware components, wherein the operation manager of the first managed system of the managed systems mediates access of the first hardware component of the plurality of hardware components and the second hardware component of the plurality of hardware components by the software stack of the first managed system of the managed systems.

10. The computer-implemented method of claim 7, wherein deploying the at least one subscription to the enhanced managed systems comprises:

enforcing, by the deployment manager using the first local subscription manager hosted by a first managed system of the managed systems, the at least one subscription on the first managed system of the managed systems.

11. The computer-implemented method of claim 7, wherein deploying the at least one subscription to the enhanced managed systems comprises:

enforcing, by the deployment manager using a second local subscription manager hosted by a second managed system of the managed systems, the at least one subscription on the second managed system of the managed systems.

12. The computer-implemented method of claim 7, wherein the first local subscription manager comprises an out of band manager hosted by the first managed system of the managed systems and that operates independently from the first managed system of the managed systems.

13. A non-transitory machine-readable medium having instructions stored therein, which when executed by a processor, cause the processor to perform operations for managing computer-implemented services provided by managed systems, the operations comprising:

obtaining, by a deployment manager that manages the managed systems, a first solution request for the managed systems, wherein the first solution request indicates a first solution to be provided using at least one subscription;

making, by the deployment manager, a first determination that the first solution is incompatible with the managed systems;

in response to the first determination that the first solution is incompatible with the managed systems:
making, by the deployment manager, a second determination that the managed systems may be made compatible with the first solution using at least one additional subscription;

in response to the second determination that the managed systems may be made compatible with the first solution using the at least one additional subscription:

obtaining, by the deployment manager, authorization for the at least one additional subscription;

deploying, by the deployment manager, the at least one additional subscription to the managed systems based on the obtained authorization to enhance the managed systems with at least one new functionality; and deploying, by the deployment manager, the at least one subscription to the enhanced managed systems, wherein the at least one subscription is dependent on the at least one new functionality.

14. The non-transitory machine-readable medium of claim 13, wherein the operations further comprise:

obtaining, by the deployment manager, a second solution request for the managed systems, wherein the second solution request indicates a second solution to be provided using at least one other subscription;

making, by the deployment manager, a third determination that the second solution is incompatible with the managed systems;

in response to the third determination that the second solution is incompatible with the managed systems:
making, by the deployment manager, a fourth determination that the managed systems may not be made compatible with the first solution using any other subscriptions; and in response to the fourth determination that the managed systems may not be made compatible with the first solution using the any other subscriptions:
performing, by the deployment manager, an action set to remediate a solution deployment failure of the second solution.

15. The non-transitory machine-readable medium of claim 14, wherein the action set comprises:

notifying, by the deployment manager, a subscription manager of the solution deployment failure of the second solution, wherein the notification indicates a missing functionality of the managed systems that may not be remediated through subscription modifications.

16. The non-transitory machine-readable medium of claim 15, wherein the action set further comprises:

deploying, by the deployment manager, an additional managed system to the managed systems, wherein the additional managed system is capable of providing the missing functionality of the managed systems.

17. A deployment manager that manages managed systems, comprising:

a memory; and a processor adapted to perform operations for managing computer-implemented services provided by managed systems, the operations comprising:

obtaining a first solution request for the managed systems, wherein the first solution request indicates a first solution to be provided using at least one subscription;

making a first determination that the first solution is incompatible with the managed systems;

in response to the first determination that the first solution is incompatible with the managed systems:
making a second determination that the managed systems may be made compatible with the first solution using at least one additional subscription;

in response to the second determination that the managed systems may be made compatible with the first solution using the at least one additional subscription:

obtaining authorization for the at least one additional subscription;

deploying the at least one additional subscription to the managed systems based on the obtained authorization to enhance the managed systems with at least one new functionality; and deploying the at least one subscription to the enhanced managed systems, wherein the at least one subscription is dependent on the at least one new functionality.

18. The deployment manager of claim 17, wherein the operations further comprise:

obtaining a second solution request for the managed systems, wherein the second solution request indicates a second solution to be provided using at least one other subscription;

making a third determination that the second solution is incompatible with the managed systems;

in response to the third determination that the second solution is incompatible with the managed systems:

making a fourth determination that the managed systems may not be made compatible with the first solution using any other subscriptions; and in response to the fourth determination that the managed systems may not be made compatible with the first solution using the any other subscriptions:

performing an action set to remediate a solution deployment failure of the second solution.

19. The deployment manager of claim 18, wherein the action set comprises:

notifying a subscription manager of the solution deployment failure of the second solution, wherein the notification indicates a missing functionality of the managed systems that may not be remediated through subscription modifications.

20. The deployment manager of claim 19, wherein the action set further comprises:

deploying an additional managed system to the managed systems, wherein the additional managed system is capable of providing the missing functionality of the managed systems.

* * * * *